(12) United States Patent
Kim et al.

(10) Patent No.: US 11,747,219 B2
(45) Date of Patent: Sep. 5, 2023

(54) LARGE-CAPACITY HYDRODYNAMIC-TYPE HYDRAULIC DYNAMOMETER WITH OUTPUT CONTROL MECHANISM

(71) Applicant: DOOSAN ENERBILITY CO., LTD, Changwon-si (KR)

(72) Inventors: Yeong Chun Kim, Changwon (KR); Jin Uk Kim, Seoul (KR); Dong Hwa Jung, Changwon (KR); Gi Won Hong, Changwon (KR); Kwang Yol Lee, Changwon (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 38 days.

(21) Appl. No.: 17/694,667

(22) Filed: Mar. 15, 2022

(65) Prior Publication Data
US 2022/0381629 A1 Dec. 1, 2022

(30) Foreign Application Priority Data

May 28, 2021 (KR) .................. 10-2021-0068914

(51) Int. Cl.
*G01L 3/20* (2006.01)
*G01L 1/02* (2006.01)
*G01L 5/13* (2006.01)

(52) U.S. Cl.
CPC .................. *G01L 1/02* (2013.01); *G01L 3/20* (2013.01); *G01L 5/13* (2013.01)

(58) Field of Classification Search
CPC ..................................... G01L 3/20; G01L 5/13
See application file for complete search history.

(56) References Cited

U.S. PATENT DOCUMENTS

| 2,428,005 | A | 9/1947 | Bennett |
| 6,572,509 | B2 | 6/2003 | Kobayashi |
| 7,032,464 | B2 | 4/2006 | Lo |
| 7,942,249 | B2 | 5/2011 | Sykes |
| 8,695,564 | B2 | 4/2014 | Murphy |
| 9,243,805 | B2 | 1/2016 | Bergen |
| 9,931,642 | B2 | 4/2018 | Maier |

(Continued)

FOREIGN PATENT DOCUMENTS

| CN | 111896157 A | 11/2020 |
| DE | 834761 C | 3/1952 |

(Continued)

OTHER PUBLICATIONS

KR Office Action, dated Aug. 10, 2022, Application 95-2022-060107598.
EESR, dated Oct. 5, 2022, EP 22166704.

*Primary Examiner* — Eric S. McCall
(74) *Attorney, Agent, or Firm* — Harvest IP Law, LLP

(57) ABSTRACT

A hydrodynamic-type hydraulic dynamometer is provided. The hydrodynamic-type hydraulic dynamometer includes a shaft rotatably mounted by a plurality of bearings, a stator fixed around the shaft and having a toroidal chamber therein, a runner rotatably coupled to the shaft and causing a fluid introduced into the toroidal chamber to flow therethrough, an inner ring mounted to extend inwardly from a radially outer side of the toroidal chamber and having a control slit formed therethrough, and a shutter configured to adjust an opening degree of the control slit.

18 Claims, 6 Drawing Sheets

(56) References Cited

U.S. PATENT DOCUMENTS

| | | | |
|---|---|---|---|
| 10,900,851 B1* | 1/2021 | Warsaw | G01L 3/18 |
| 2009/0081019 A1 | 3/2009 | Sykes | |
| 2009/0126510 A1* | 5/2009 | Engstrom | G01L 3/20 |
| | | | 73/862.14 |
| 2022/0381629 A1* | 12/2022 | Kim | G01L 1/02 |
| 2022/0404221 A1* | 12/2022 | Kim | G01L 3/04 |
| 2023/0057234 A1* | 2/2023 | Huff | B64D 31/00 |

FOREIGN PATENT DOCUMENTS

| | | |
|---|---|---|
| JP | 06 039314 Y2 | 10/1994 |
| JP | 2006501410 A | 1/2006 |
| JP | 4988601 B2 | 5/2012 |
| KR | 101226326 B1 | 1/2013 |

* cited by examiner

LARGE-CAPACITY HYDRODYNAMIC-TYPE HYDRAULIC DYNAMOMETER WITH OUTPUT CONTROL MECHANISM

CROSS-REFERENCE TO RELATED APPLICATION

This application claims priority to Korean Patent Application No. 10-2021-0068914, filed on May 28, 2021, the disclosure of which is incorporated herein by reference in its entirety.

BACKGROUND

Technical Field

Apparatuses and methods consistent with exemplary embodiments relate to a large-capacity hydrodynamic-type hydraulic dynamometer with output control mechanism, and more particularly, to a large-capacity hydrodynamic-type hydraulic dynamometer having a mechanism for controlling output of the hydraulic dynamometer by adjusting an amount of a recirculating working fluid.

Description of the Related Art

In general, a high-power engine uses a hydraulic dynamometer using water, which is a device that absorbs engine power to measure the absorbed power for engine performance testing.

Various types of dynamometers are used depending on the output and operating (i.e., rotational) speed of an engine. Dynamometers used in large-capacity and high-speed engines such as gas turbines may be classified into a friction-disk-type dynamometer called a Kahn type dynamometer and a hydrodynamic-type dynamometer called a Froude type dynamometer.

A hydraulic dynamometer absorbs engine power transmitted to the dynamometer by hydraulic resistance between a rotor, a stator, and a housing. To control cavitation and load fluctuation is the key in the hydraulic dynamometer, which is mainly used for performance testing of large high-speed gas turbines having 100 MW or more and 3,000 rpm or more. That is, an additional increase in output and resolution of excessive load fluctuation are required in the hydrodynamic-type hydraulic dynamometer.

For example, if the output of 270 MW high-speed large gas turbine is measured with a related art hydraulic dynamometer, the output of the gas turbine may be unstable at the 20% level thereof and the blade of the runner of the gas turbine may be damaged due to excessive fluctuation and cavitation.

SUMMARY

Aspects of one or more exemplary embodiments provide a large-capacity hydrodynamic-type hydraulic dynamometer with output control mechanism, which is capable of controlling a flow rate of recirculating fluid by a shutter mechanism that adjusts a flow rate of fluid circulating in a toroidal chamber in order to solve output drop and uncontrollable phenomenon occurring in the large-capacity hydrodynamic-type hydraulic dynamometer such as in a load test of a large-capacity gas turbine.

Additional aspects will be set forth in part in the description which follows and, in part, will become apparent from the description, or may be learned by practice of the exemplary embodiments.

According to an aspect of an exemplary embodiment, there is provided a hydrodynamic-type hydraulic dynamometer including: a shaft rotatably mounted by a plurality of bearings, a stator fixed around the shaft and having a toroidal chamber therein, a runner rotatably coupled to the shaft and causing a fluid introduced into the toroidal chamber to flow therethrough, an inner ring mounted to extend inwardly from a radially outer side of the toroidal chamber and having a control slit formed therethrough, and a shutter configured to adjust an opening degree of the control slit.

The toroidal chamber may include a pair of toroidal chambers having bilateral symmetry, and the runner may include a plurality of blades exposed to an inside of each of the pair of toroidal chambers to circulate the fluid introduced into the toroidal chamber.

The hydrodynamic-type hydraulic dynamometer may further include a guide ring disposed between the pair of toroidal chambers and having both sides forming a portion of inner peripheral surface of each toroidal chamber.

The stator may further include a drain chamber formed radially outside the pair of toroidal chambers.

The pair of toroidal chambers may further include a pair of drain slots formed on the radially outer sides thereof to communicate with the drain chamber between the pair of toroidal chambers and the guide ring.

The stator may further include inlet chambers formed on each axial side of the pair of toroidal chambers.

The pair of toroidal chambers may include a pair of fluid supply nozzles formed on radially inner sides thereof to communicate from the inlet chambers to the toroidal chambers.

The toroidal chamber may have an elliptical cross-section.

The hydrodynamic-type hydraulic dynamometer may further include an actuator mounted on an outer peripheral surface of the stator to move the shutter in a radial direction.

The hydrodynamic-type hydraulic dynamometer may further include a displacement sensor provided on one side of the actuator to measure a displacement of the shutter.

The hydrodynamic-type hydraulic dynamometer may further include a stopper provided radially inside the actuator to limit a maximum displacement of the actuator.

According to an aspect of another exemplary embodiment, there is provided a hydrodynamic-type hydraulic dynamometer including: a shaft rotatably mounted by a plurality of bearings, a stator fixed around the shaft and having a pair of toroidal chambers therein, a runner rotatably coupled to the shaft and having a plurality of blades to circulate a fluid introduced into the pair of toroidal chamber, a pair of inner rings mounted to extend inwardly from radially outer sides of the pair of toroidal chambers and each having a control slit formed therethrough, a guide ring disposed between the pair of toroidal chambers and having both sides forming a portion of inner peripheral surface of each toroidal chamber, and a shutter configured to adjust an opening degree of the control slit.

The hydrodynamic-type hydraulic dynamometer may further include an actuator mounted on an outer peripheral surface of the stator to move the shutter in a radial direction, and a stopper provided radially inside the actuator to limit a maximum displacement of the actuator.

The hydrodynamic-type hydraulic dynamometer may further include a displacement sensor provided on one side of the actuator to measure a displacement of the shutter.

The stator may further include a pair of inlet chambers formed on each axial side of the pair of toroidal chambers, and a drain chamber formed radially outside the pair of toroidal chambers.

The pair of toroidal chambers may include a pair of fluid supply nozzles formed on radially inner sides thereof to communicate from the inlet chambers to the toroidal chambers.

The pair of toroidal chambers may further include a pair of drain slots formed on the radially outer sides thereof to communicate with the drain chamber between the pair of toroidal chambers and the guide ring.

The pair of inner rings each having the control slit and the shutter each may include a plurality of inner rings having a plurality of control slits and a plurality of shutters arranged circumferentially in the pair of toroidal chambers, and the plurality of shutters may adjust opening degree of some of the plurality of control slits arranged in upper halves of the toroidal chambers.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
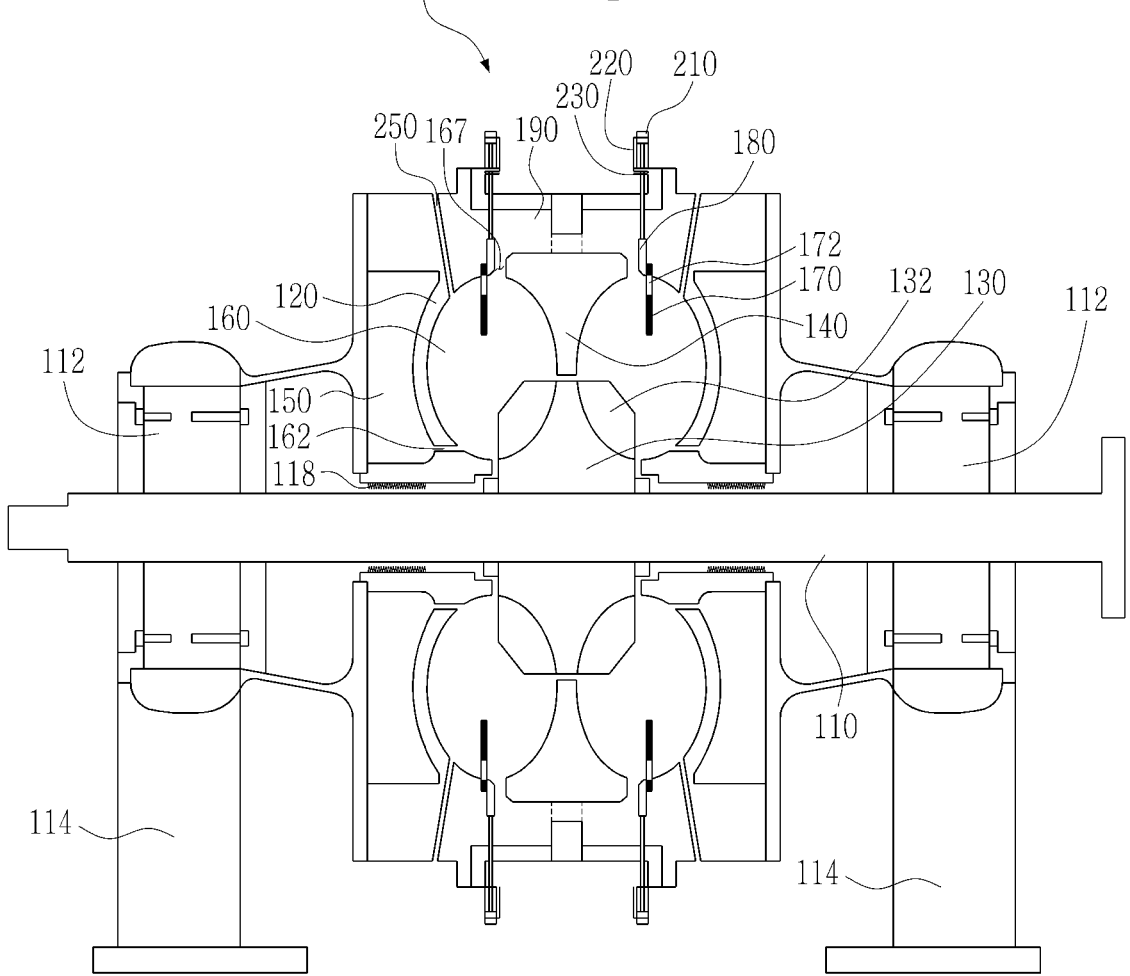
FIG. 1 is a cross-sectional view illustrating a hydrodynamic-type hydraulic dynamometer according to an exemplary embodiment.

Various modifications and various embodiments will be described below in detail with reference to the accompanying drawings so that those skilled in the art can easily carry out the disclosure. It should be understood, however, that the present disclosure is not intended to be limited to the specific embodiments, but the present disclosure includes all modifications, equivalents, and alternatives of the embodiments included within the spirit and scope disclosed herein.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a hydrodynamic-type hydraulic dynamometer according to exemplary embodiments will be described with reference to the accompanying drawings. It should be noted that like reference numerals refer to like parts throughout the specification. In certain exemplary embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

Figure 2:
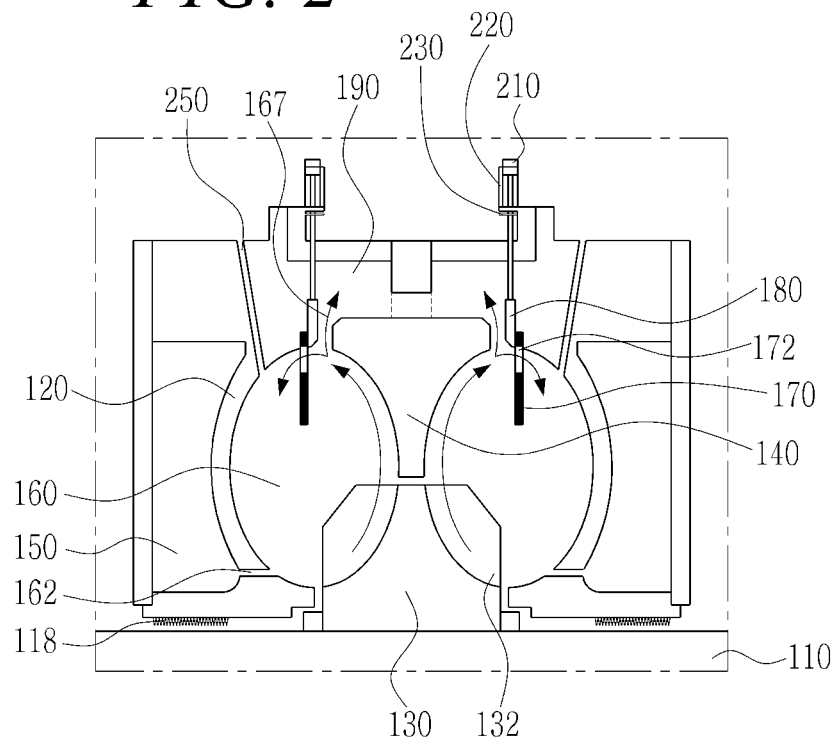
FIG. 2 is a cross-sectional view illustrating an upper half of the hydrodynamic-type hydraulic dynamometer of FIG. 1.
Figure 3:
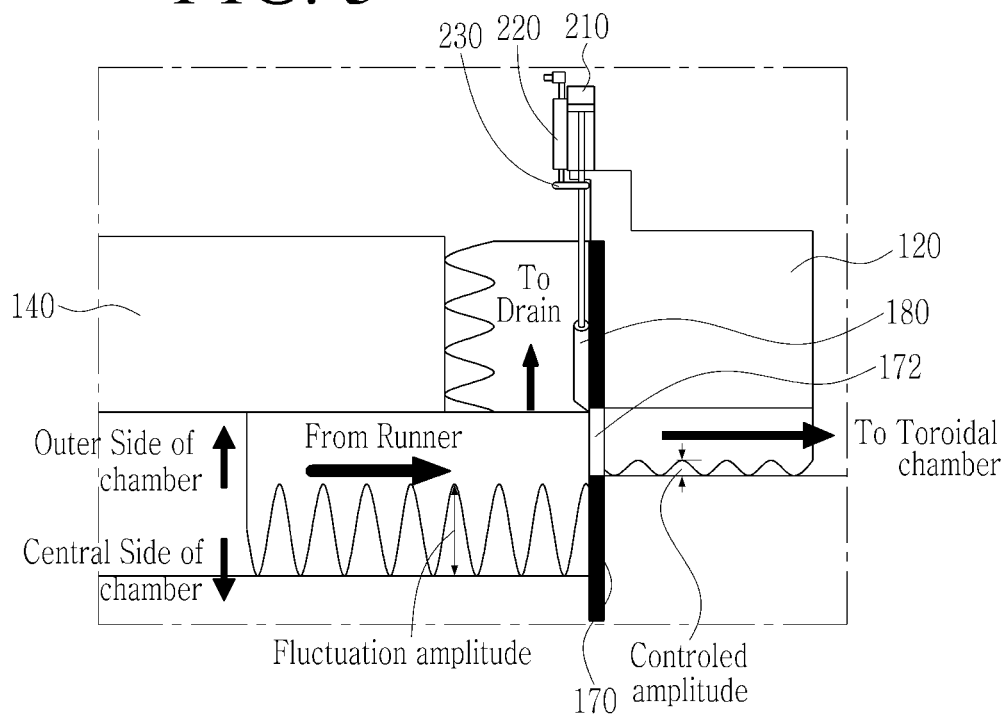
FIG. 3 is a partial cross-sectional view illustrating a flow of fluid supplied through fluid supply nozzles, a flow of fluid recirculated to a toroidal chamber through a slit of an inner ring, and a flow of fluid discharged through a drain slot in the hydrodynamic-type hydraulic dynamometer of FIG. 2.

FIG. 1 is a cross-sectional view illustrating a hydrodynamic-type hydraulic dynamometer according to an exemplary embodiment. FIG. 2 is a cross-sectional view illustrating an upper half of the hydrodynamic-type hydraulic dynamometer of FIG. 1. FIG. 3 is a partial cross-sectional view illustrating a flow of fluid supplied through fluid supply nozzles, a flow of fluid recirculated to a toroidal chamber through a slit of an inner ring, and a flow of fluid discharged through a drain slot in the hydrodynamic-type hydraulic dynamometer of FIG. 2.

Referring to FIG. 1, the hydrodynamic-type hydraulic dynamometer 100 according to the exemplary embodiment may include a shaft 110 rotatably mounted by a plurality of bearings 112, a stator 120 fixed around the shaft 110 and having a toroidal chamber 160 therein, a runner 130 rotatably coupled to the shaft 110 and allowing a fluid introduced into the toroidal chamber 160 to flow therethrough, an inner ring 170 mounted to extend inwardly from a radially outer side of the toroidal chamber 160 and having a control slit 172 formed therethrough, and a shutter 180 configured to adjust an opening degree of the control slit 172.

The shaft 110 may have one end coupled to a rotary shaft of a target to be measured. The shaft 110 may be rotatably mounted by a pair of bearings 112 coupled to both sides of the stator 120 by passing through the stator 120. Each of the pair of bearings 112 may be supported on the ground by a support 114.

The stator 120 may have both sides connected to a casing for the pair of bearing 112 to be supported by a pair of supports 114. The stator 120 may have a shaft hole penetrating through the shaft 110 to be fixed around the shaft 110. The stator 120 may include the toroidal chamber 160 therein. The toroidal chamber 160 may be disposed around the shaft 110 to surround the shaft 110.

The runner 130 may be rotatably coupled to the shaft 110 and may cause a fluid introduced into the toroidal chamber 160 to flow therethrough. The runner 130 is coupled to the shaft 110 and rotates together, and may form a portion of an inner peripheral surface of the toroidal chamber 160.

The runner 130 may include a plurality of blades 132 exposed to an internal space of the toroidal chamber 160. The plurality of blades 132 may be formed integrally and arranged in a circumferential direction of the runner 130.

The inner ring 170 is a flat plate in a form of a fan, and may be mounted to extend from the outside in the radial direction of the toroidal chamber 160 to the inside to prevent the flow of the fluid circulated in the toroidal chamber 160. The control slit 172 is formed to pass through the inner ring 170 and has an elongated shape in the circumferential direction, thereby enabling a fluid to be circulated through the control slit 172.

The shutter 180 may be radially movably mounted on the stator 120 to adjust the opening degree of the control slit 172. The shutter 180 may include a plurality of shutters arranged in the circumferential direction outside the toroidal chamber 160 of the stator 120. As each shutter 180 moves further radially inward, the opening degree of the control slit 172 of the inner ring 170 may decrease.

The toroidal chamber 160 may include a pair of toroidal chambers having bilateral symmetry. Each of the toroidal chambers 160 may have a circular or elliptical cross-section. When the toroidal chamber 160 has an elliptical cross-section, the fluid in the toroidal chamber 160 rotated by the shaft 110 and subjected to centrifugal force may flow smoothly in the circumferential direction while recirculating.

A guide ring 140 may be disposed between the pair of toroidal chambers 160, and both side surfaces may form a part of the inner peripheral surface of each toroidal chamber 160. The guide ring 140 may have a radially inner surface forming about 90 degrees with the inner peripheral surfaces of the pair of toroidal chambers 160. The guide ring 140 may continue to extend in the circumferential direction or may be integrally formed. The guide ring 140 may have a radially inner end spaced apart from the radially outer end of the runner 130 by a predetermined distance. Thus, a portion of the fluid flowing in one of the pair of toroidal chambers 160 may be mixed with the fluid flowing in the other toroidal chamber of the pair of toroidal chambers 160.

The stator 120 may further include inlet chambers 150 formed on each axial side surface of the pair of toroidal chambers 160. The pair of inlet chambers 150 serves to temporarily store the working fluid to be supplied to the pair of toroidal chambers 160.

The pair of toroidal chambers 160 may include a pair of fluid supply nozzles 162 radially inside thereof to communicate from the inlet chambers 150 to the toroidal chambers 160. The pair of fluid supply nozzles 162 may be formed near the relatively radially inner ends of the pair of toroidal chambers 160 on the axial outer surfaces thereof. For example, the pair of fluid supply nozzles 162 may be formed substantially parallel to the shaft 110. Accordingly, the fluid in the pair of inlet chambers 150 may be introduced into the pair of toroidal chambers 160 through the pair of fluid supply nozzles 162, and circulate in each of the toroidal chambers 160 by the blades 132 of the runner 130.

The stator 120 may further include a drain chamber 190 formed radially outside the pair of toroidal chambers 160. The drain chamber 190 may be continuously circumferentially formed radially outside the pair of toroidal chambers 160 of the stator 120. The drain chamber 190 may be sealed by a cover coupled to the stator 120 outside a groove continuously formed on the outer peripheral surface of the stator 120. The drain chamber 190 may be partitioned by a pair of partitions outside the pair of toroidal chambers 160. The partitioned drain chambers 190 may have internal spaces that communicate with each other through communication holes formed through the partitions.

The pair of toroidal chambers 160 may further include a pair of drain slots 167 formed on the outside in the radial direction to communicate with the drain chamber 190 between the pair of toroidal chambers 160 and the guide ring 140. That is, the pair of drain slots 167 may be formed with a predetermined size between both sides of the guide ring 140 in the axial direction and the stator 120. One drain slot 167 may be continuously formed along the circumference, or a plurality of drain slots 167 may be arranged at predetermined intervals.

Although FIG. 1 illustrates the pair of toroidal chambers 160, it is understood that two or more pairs of toroidal chambers 160 may be disposed depending on the capacity of the hydraulic dynamometer. In the case of two or more pairs of toroidal chambers 160, two or more pairs of inlet chambers 150, inner rings 170, and shutters 180 may be provided, and two or more runners 130, guide rings 140, and drain chambers 190 may be provided.

Meanwhile, the stator 120 may include a seal member 118 configured to seal a gap between the stator 120 and the shaft 110 on an inner circumferential surface thereof. The seal member 118 may be made of an elastic material and may have a cross-section in a form of a plurality of wedges continuously formed along the circumference. The seal member 118 may include a pair of seal members provided on each axial side of the pair of toroidal chambers 160.

The pair of toroidal chambers 160 may have air feeders 250 formed therethrough from the outside of the stator 120, respectively. In general, water may be used as the working fluid circulated in the pair of toroidal chambers 160. However, if the hydraulic dynamometer is operated in the state in which air is contained in the pair of toroidal chambers 160 before supplying the working fluid, the working fluid and the air may be circulated and discharged together. Thus, when air is insufficient in the pair of toroidal chambers 160, air may be supplied through the pair of air feeders 250. Each of the air feeders 250 may be a hole that opens to the outside, but preferably a switching valve capable of opening and closing the outlet of the air feeder is provided.

The shutter 180 may be manually operated to adjust the opening degree of the control slit 172, but it is preferable to operate an actuator 210 to adjust the opening degree of the control slit 172. The actuator 210 may be mounted on the outer peripheral surface of the stator 120 to move the shutter 180 in the radial direction. The actuator 210 may be installed to be exposed on the outer peripheral surface of the stator 120, and may have a drive shaft connected to the shutter 180 by a straight bar. The actuator 210 may be a hydraulic motor capable of forward rotation and reverse rotation.

The actuator 210 may be provided at one side thereof with a displacement sensor 220 configured to measure the displacement of the shutter 180. The displacement sensor 220 may be a one-dimensional sensor and measure the displacement of the shutter 180 by measuring the displacement of the drive shaft of the actuator 210. The opening degree of the control slit 172 may be feedback-controlled by measuring the displacement of the shutter 180 using the displacement sensor 220.

The hydraulic dynamometer 100 may further include a stopper 230 provided radially inside the actuator 210 to limit the maximum displacement of the actuator 210. The stopper 230 may be disposed radially inside the actuator 210 on the outer peripheral surface of the stator 120 to limit the maximum forward position of the drive shaft of the actuator 210, thereby limiting the maximum forward position of the shutter 180.

Referring to FIGS. 2 and 3, when a target to be measured, such as a gas turbine, is operated with a rotary shaft connected to the shaft 110, the hydrodynamic-type hydraulic dynamometer 100 may measure the output of the target. In this case, the working fluid, such as water, in the inlet chamber 150 is supplied into the toroidal chamber 160 through the fluid supply nozzle 162 and is circulated by the runner 130 inside the toroidal chamber 160. A part of the working fluid is discharged to the drain chamber 190 through the drain slot 167 and the remaining working fluid is recirculated through the slit 172 of the inner ring 170. The working fluid recirculated in the toroidal chamber 160 has increased output while being repeatedly reintroduced by the runner 130. That is, the output of the hydraulic dynamometer 100 is converted into an output of a change in hydrodynamic momentum, which is determined by the sum of the supply fluid supplied through the fluid supply nozzle 162 and the working fluid recirculated in the toroidal chamber 160, and a friction loss occurring in this process.

Here, in order to control the flow rate of the working fluid recirculated in the toroidal chamber 160, the output of the hydraulic dynamometer may be controlled such that the inner ring 170 having the control slit 172 and the shutter 180 are installed to control the opening degree of the control slit 172 and the number of openings of a plurality of control slits 172.

As illustrated in FIG. 3, the working fluid circulated by the runner 130 basically has a predetermined fluctuation amplitude according to the rotational flow of the fluid. Accordingly, the working fluid recirculated in the toroidal chamber 160 and the working fluid discharged to the drain chamber 190 inevitably have a predetermined fluctuation amplitude. In the hydrodynamic-type hydraulic dynamometer 100 according to the exemplary embodiment, the fluctuation amplitude of the working fluid recirculated in the toroidal chamber 160 may be controlled relatively small by adjusting the opening degree of the control slit 172 using the shutter 180. Accordingly, it is possible to reduce load fluctuation and increase stability compared to the flow rate of the working fluid.

Figure 4A:
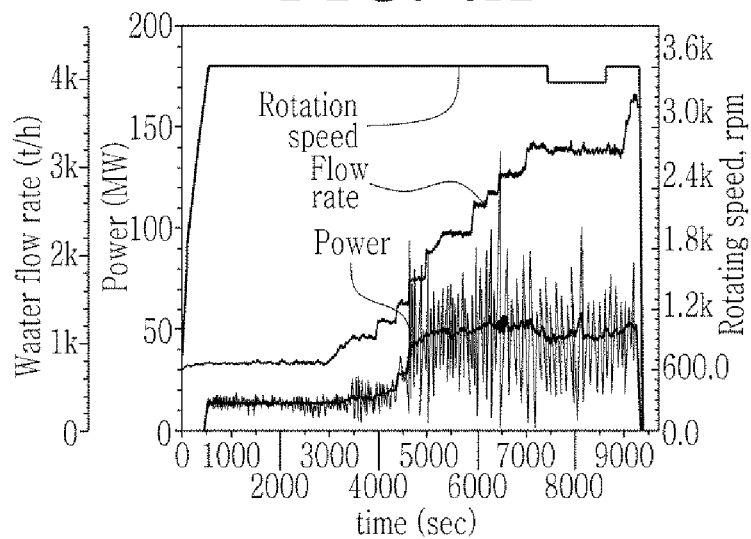
FIG. 4A illustrates a graph of a variation in output with the flow rate of feed water in a related art hydrodynamic-type hydraulic dynamometer with no output control mechanism and FIG. 4B illustrates a graph of a variation in output with the flow rate of feed water in the hydrodynamic-type hydraulic dynamometer of the exemplary embodiment.
Figure 4B:
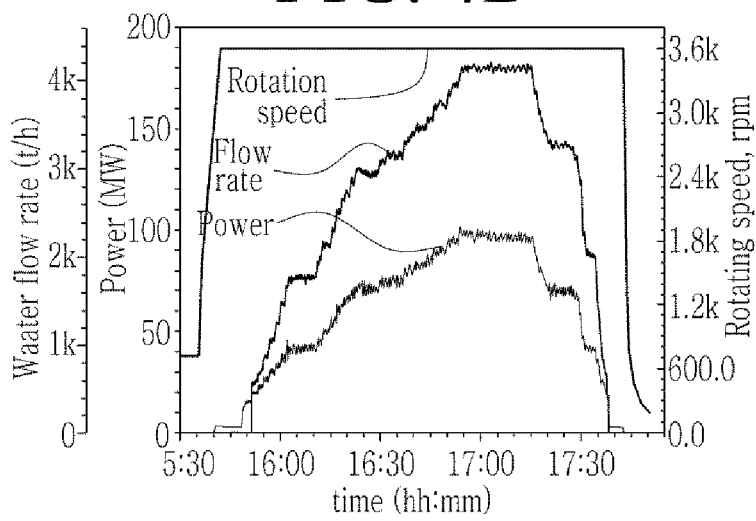

FIG. 4A illustrates a graph of a variation in output with the flow rate of feed water in a related art hydrodynamic-type hydraulic dynamometer with no output control mechanism and FIG. 4B illustrates a graph of a variation in output with the flow rate of feed water in the hydrodynamic-type hydraulic dynamometer with output control mechanism of the exemplary embodiment.

Here, the output control mechanism in the hydrodynamic-type hydraulic dynamometer 100 of the exemplary embodiment refers to a mechanism in which the shutter 180 adjusts the opening degree of the control slit 172 formed in the inner ring 170 for output control.

Referring to FIG. 4A, in the case of the related art hydrodynamic-type hydraulic dynamometer, it can be seen that a load fluctuation amplitude is very large in the graph of the variation in output with the change in flow rate of water as a working fluid.

On the other hand, referring to FIG. 4B, in the case of the hydrodynamic-type hydraulic dynamometer of the exemplary embodiment, it can be seen that a load fluctuation amplitude is very small in the graph of the variation in output with the change in flow rate of water as a working fluid. That is, the output control mechanism of the exemplary embodiment can make the load fluctuation amplitude very small and increase the stability.

Figure 5:
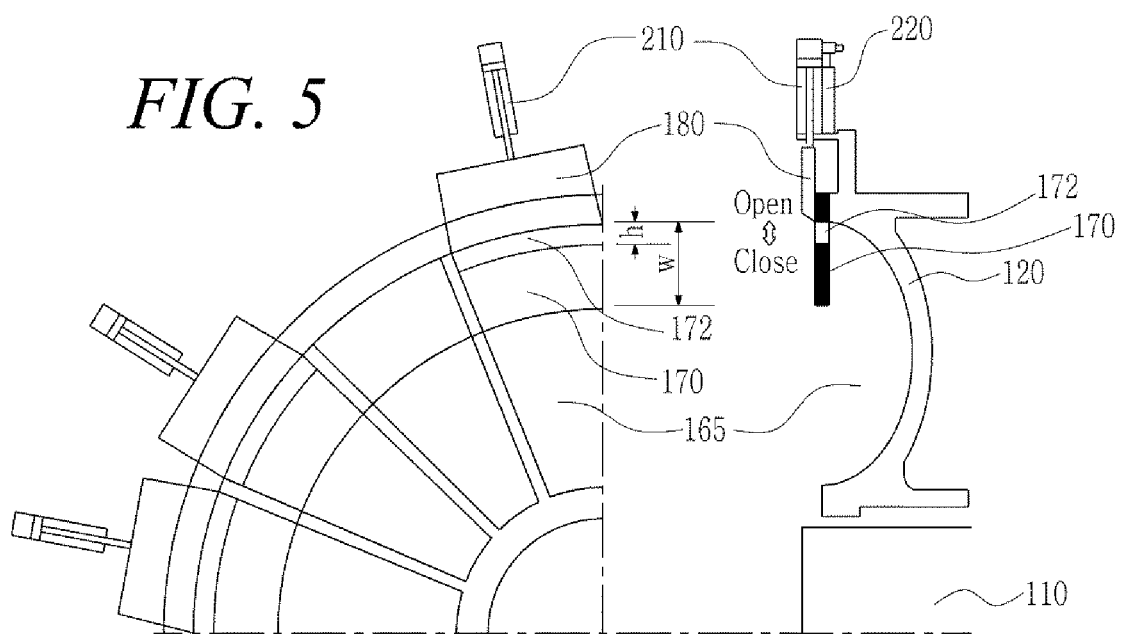
FIG. 5 is a partial cross-sectional view illustrating an output control mechanism in the hydrodynamic-type hydraulic dynamometer of the exemplary embodiment.
Figure 6:
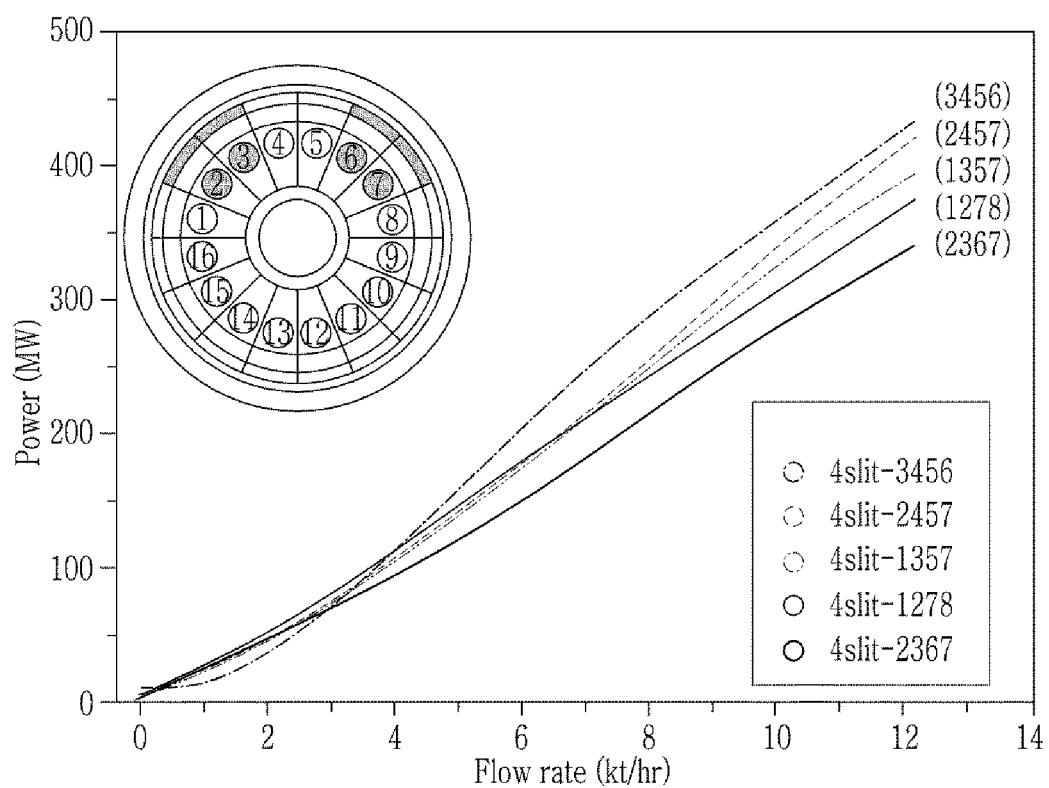
FIG. 6 is a graph illustrating a comparison between variations in output with the change in flow rate when a slit set is changed circumferentially in position in the hydrodynamic-type hydraulic dynamometer of the exemplary embodiment.
Figure 7:
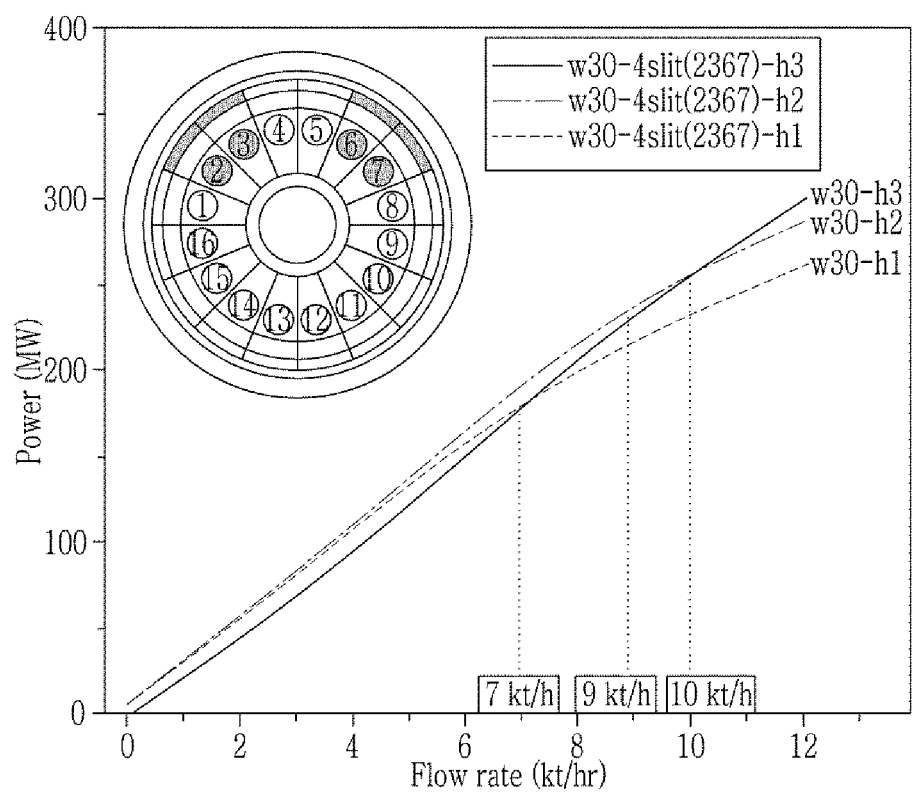
FIG. 7 is a graph illustrating a variation in output with the change in flow rate with respect to several opening degrees of slits in a slit set at a predetermined position in the hydrodynamic-type hydraulic dynamometer of the exemplary embodiment.

FIG. 5 is a partial cross-sectional view illustrating the output control mechanism in the hydrodynamic-type hydraulic dynamometer of the exemplary embodiment. FIG. 6 is a graph illustrating a comparison between variations in output with the change in flow rate when a slit set is changed circumferentially in position in the hydrodynamic-type hydraulic dynamometer of the exemplary embodiment. FIG. 7 is a graph illustrating a variation in output with the change in flow rate with respect to several opening degrees of slits in a slit set at a predetermined position in the hydrodynamic-type hydraulic dynamometer of the exemplary embodiment.

For example, the right side of FIG. 5 is an axial cross-sectional view illustrating a portion of an output control mechanism of the right toroidal chamber 160 of the pair of toroidal chambers, and the left side of FIG. 5 is a quarter cross-sectional view of a portion of an output control mechanism cut in a plane perpendicular to the shaft 110.

Referring to FIG. 5, a plurality of inner rings 170 having control slits 172 and a plurality of shutters 180 may be arranged in the circumferential direction in the pair of toroidal chambers 160. In this case, the plurality of shutters 180 may adjust the opening degrees of some of the plurality of control slits 172 arranged in the upper half of the toroidal chambers 160.

The plurality of inner rings 170 may be continuously arranged in the circumferential direction, and a pocket 165 may be formed in a space below each inner ring 170 in the toroidal chamber 160.

For example, the control slits 172 may not be formed in all of the plurality of inner rings 170, but may be formed only in some of the plurality of inner rings 170. The plurality of shutters 180 may be disposed only at positions in which the control slits 172 are formed. As illustrated in FIG. 5, each of the inner rings 170 may be mounted to extend radially inwardly from the inner peripheral surface of the toroidal chamber 160 by a length of w, and each of the control slits 172 may have a radial height of h. Thus, each of the shutters 180 may open or close the opening height h of the control slit 172 by 0 to 100%.

For example, referring to FIG. 6, when sixteen inner rings 170 are continuously arranged in the circumferential direction, the control slit 172 may be formed only on four upper half inner rings 170 among the sixteen inner rings 170. To test the load fluctuation of the controlled control slit 172, the variation in output with respect to the flow rate was measured for five combinations. As a result of the test, as illustrated in FIG. 6, it can be seen that controlling the opening degrees of the four control slits 172 disposed in positions ②, ③, ⑥, and ⑦ has the best output linearity and stability.

In addition, the height h of each control slit 172 may be selected differently depending on the maximum output. Referring to FIG. 7, when each of the four control slits 172 disposed in positions ②, ③, ⑥, and ⑦ has a height of h1, it can be seen that the slope of the output with respect to the flow rate is smaller when the flow rate is 7 kt/hr or more. In addition, when the control slit 172 has a height of h2 which is slightly larger than h1 it can be seen that the slope of the output with respect to the flow rate becomes smaller when the flow rate is 9 kt/hr or more. Further, when the control slit 172 has a height of h3 which is slightly larger than h2, it can be seen that the slope of the output with respect to the flow rate becomes smaller when the flow rate is 10 kt/hr or more.

From these test results, it can be seen that there is an optimal height of the control slit 172 that can maintain the linearity of the output with respect to the flow rate. Accordingly, the height of the control slit 172 may be appropriately designed so that the linearity is maintained in the output graph for the flow rate according to the output range measured by the hydrodynamic-type hydraulic dynamometer.

As described above, the large-capacity hydrodynamic-type hydraulic dynamometer with output control mechanism according to the exemplary embodiments can control the flow rate of recirculating fluid by the shutter mechanism that controls the flow rate of fluid circulating through the toroidal chamber to solve a decrease in output and an uncontrollable phenomenon that occur in the large-capacity hydrodynamic-type hydraulic dynamometer such as load test of the large-capacity gas turbine.

While one or more exemplary embodiments have been described with reference to the accompanying drawings, it will be apparent to those skilled in the art that various variations and modifications in form and details may be made by adding, changing, or removing components without departing from the spirit and scope of the disclosure as defined in the appended claims, and these variations and modifications fall within the spirit and scope of the disclosure as defined in the appended claims. Accordingly, the description of the exemplary embodiments should be construed in a descriptive sense only and not to limit the scope of the claims, and many alternatives, modifications, and variations will be apparent to those skilled in the art.

What is claimed is:

1. A hydrodynamic-type hydraulic dynamometer comprising:
    a shaft rotatably mounted by a plurality of bearings;
    a stator fixed around the shaft and having a toroidal chamber therein;
    a runner rotatably coupled to the shaft and causing a fluid introduced into the toroidal chamber to flow therethrough;
    an inner ring mounted to extend inwardly from a radially outer side of the toroidal chamber and having a control slit formed therethrough; and
    a shutter configured to adjust an opening degree of the control slit.

2. The hydrodynamic-type hydraulic dynamometer according to claim 1, wherein
    the toroidal chamber comprises a pair of toroidal chambers having bilateral symmetry, and
    the runner comprises a plurality of blades exposed to an inside of each of the pair of toroidal chambers to circulate the fluid introduced into the toroidal chamber.

3. The hydrodynamic-type hydraulic dynamometer according to claim 2, further comprising a guide ring disposed between the pair of toroidal chambers and having both sides forming a portion of inner peripheral surface of each toroidal chamber.

4. The hydrodynamic-type hydraulic dynamometer according to claim 3, wherein the stator further comprises a drain chamber formed radially outside the pair of toroidal chambers.

5. The hydrodynamic-type hydraulic dynamometer according to claim 4, wherein the pair of toroidal chambers further comprise a pair of drain slots formed on the radially outer sides thereof to communicate with the drain chamber between the pair of toroidal chambers and the guide ring.

6. The hydrodynamic-type hydraulic dynamometer according to claim 5, wherein the stator further includes inlet chambers formed on each axial side of the pair of toroidal chambers.

7. The hydrodynamic-type hydraulic dynamometer according to claim 6, wherein the pair of toroidal chambers includes a pair of fluid supply nozzles formed on radially inner sides thereof to communicate from the inlet chambers to the toroidal chambers.

8. The hydrodynamic-type hydraulic dynamometer according to claim 1, wherein the toroidal chamber has an elliptical cross-section.

9. The hydrodynamic-type hydraulic dynamometer according to claim 1, further comprising an actuator mounted on an outer peripheral surface of the stator to move the shutter in a radial direction.

10. The hydrodynamic-type hydraulic dynamometer according to claim 9, further comprising a displacement sensor provided on one side of the actuator to measure a displacement of the shutter.

11. The hydrodynamic-type hydraulic dynamometer according to claim 10, further comprising a stopper provided radially inside the actuator to limit a maximum displacement of the actuator.

12. A hydrodynamic-type hydraulic dynamometer comprising:
    a shaft rotatably mounted by a plurality of bearings;
    a stator fixed around the shaft and having a pair of toroidal chambers therein;
    a runner rotatably coupled to the shaft and having a plurality of blades to circulate a fluid introduced into the pair of toroidal chambers;
    a pair of inner rings mounted to extend inwardly from radially outer sides of the pair of toroidal chambers and each having a control slit formed therethrough;
    a guide ring disposed between the pair of toroidal chambers and having both sides forming a portion of inner peripheral surface of each toroidal chamber; and
    a shutter configured to adjust an opening degree of the control slit.

13. The hydrodynamic-type hydraulic dynamometer according to claim 12, further comprising:
    an actuator mounted on an outer peripheral surface of the stator to move the shutter in a radial direction; and
    a stopper provided radially inside the actuator to limit a maximum displacement of the actuator.

14. The hydrodynamic-type hydraulic dynamometer according to claim 13, further comprising a displacement sensor provided on one side of the actuator to measure a displacement of the shutter.

15. The hydrodynamic-type hydraulic dynamometer according to claim 12, wherein the stator further comprises a pair of inlet chambers formed on each axial side of the pair of toroidal chambers, and a drain chamber formed radially outside the pair of toroidal chambers.

16. The hydrodynamic-type hydraulic dynamometer according to claim 15, wherein the pair of toroidal chambers includes a pair of fluid supply nozzles formed on radially inner sides thereof to communicate from the inlet chambers to the toroidal chambers.

17. The hydrodynamic-type hydraulic dynamometer according to claim 16, wherein the pair of toroidal chambers further includes a pair of drain slots formed on the radially outer sides thereof to communicate with the drain chamber between the pair of toroidal chambers and the guide ring.

18. The hydrodynamic-type hydraulic dynamometer according to claim 13, wherein the pair of inner rings each having the control slit and the shutter each includes a plurality of inner rings having a plurality of control slits and a plurality of shutters arranged circumferentially in the pair of toroidal chambers, and the plurality of shutters adjust opening degree of some of the plurality of control slits arranged in upper halves of the toroidal chambers.

\* \* \* \* \*